(12) United States Patent
Parfitt

(10) Patent No.: US 12,061,456 B2
(45) Date of Patent: Aug. 13, 2024

(54) ELECTRICAL APPLIANCE WITH SENSORS FOR DETECTING HAZARDS

(71) Applicant: Connected Innovations Limited, Woking (GB)

(72) Inventor: Anthony D. Parfitt, Leatherhead (GB)

(73) Assignee: Connected Innovations Limited, Woking (GB)

( * ) Notice: Subject to any disclaimer, the term of this patent is extended or adjusted under 35 U.S.C. 154(b) by 626 days.

(21) Appl. No.: 17/041,520

(22) PCT Filed: Jul. 16, 2019

(86) PCT No.: PCT/GB2019/051986
§ 371 (c)(1),
(2) Date: Sep. 25, 2020

(87) PCT Pub. No.: WO2020/016570
PCT Pub. Date: Jan. 23, 2020

(65) Prior Publication Data
US 2021/0124327 A1    Apr. 29, 2021

(30) Foreign Application Priority Data

Jul. 16, 2018  (GB) ..................................... 1811648

(51) Int. Cl.
*G05B 19/042* (2006.01)
*G01J 5/00* (2022.01)
(Continued)

(52) U.S. Cl.
CPC ........ *G05B 19/0428* (2013.01); *G01J 5/0096* (2013.01); *G01J 5/12* (2013.01);
(Continued)

(58) Field of Classification Search
CPC ...... G01J 2005/123; G01J 5/0096; G01J 5/12; G01K 13/00; G01K 2207/00;
(Continued)

(56) References Cited

U.S. PATENT DOCUMENTS

| 4,133,016 A | 1/1979 | Tanguy |
| 5,590,010 A | 12/1996 | Ceola et al. |

(Continued)

FOREIGN PATENT DOCUMENTS

| CN | 201840321 U | 5/2011 |
| CN | 202004431 U | 10/2011 |

(Continued)

OTHER PUBLICATIONS

International Search Report and Written Opinion in International Patent Application No. PCT/GB2019/051986 dated Sep. 10, 2019, 11 pages.

(Continued)

*Primary Examiner* — Jared Fureman
*Assistant Examiner* — Nicolas Bellido
(74) *Attorney, Agent, or Firm* — Smith Baluch LLP

(57) ABSTRACT

An electrical safety device is described which includes a socket arranged to receive an electrical plug of an electrical appliance to connect a current supply to the electrical appliance, a thermal sensor arranged to detect the surface temperature of an electrical plug when received in the socket and a processor in communication with the thermal sensor, the processor configured to determine when the sensed surface temperature exceeds a predetermined threshold. The invention also includes an electrical safety system comprising the electrical safety device configured to communicate with a remote device. The device and system provide early detection of electrical faults and hazards to reduce the risk of fires.

19 Claims, 7 Drawing Sheets

(51) Int. Cl.
*G01J 5/12* (2006.01)
*G08B 21/18* (2006.01)
*G08C 17/02* (2006.01)
*H01R 13/713* (2006.01)
*H02H 5/04* (2006.01)
*G08B 3/10* (2006.01)
*G08B 5/22* (2006.01)

(52) U.S. Cl.
CPC ........... *G08B 21/182* (2013.01); *G08C 17/02* (2013.01); *H01R 13/7137* (2013.01); *H02H 5/045* (2013.01); *G01J 2005/123* (2013.01); *G05B 2219/24024* (2013.01); *G08B 3/10* (2013.01); *G08B 5/22* (2013.01); *G08B 21/185* (2013.01)

(58) Field of Classification Search
CPC ...... G05B 19/0428; G05B 2219/24024; G08B 17/06; G08B 17/10; G08B 17/12; G08B 21/14; G08B 21/18; G08B 21/182; G08B 21/185; G08B 3/10; G08B 5/22; G08C 17/02; H01R 13/7137; H02H 1/0023; H02H 3/04; H02H 5/045
See application file for complete search history.

(56) References Cited

U.S. PATENT DOCUMENTS

| | | | |
|---|---|---|---|
| 5,600,306 | A | 2/1997 | Ichikawa et al. |
| 5,742,464 | A | 4/1998 | Ceola et al. |
| 7,808,760 | B2 * | 10/2010 | Kopelman ............. H02H 5/045 361/103 |
| 8,514,540 | B2 * | 8/2013 | Besore ....................... H02J 3/14 361/97 |
| 10,161,806 | B2 | 12/2018 | Lermann |
| 2007/0276613 | A1 * | 11/2007 | Kim ........................ H02H 5/042 702/33 |
| 2008/0013239 | A1 | 1/2008 | Kopelman |
| 2009/0108680 | A1 | 4/2009 | Minemura |
| 2012/0049639 | A1 * | 3/2012 | Besore ................... G01K 3/005 307/97 |
| 2012/0206840 | A1 | 8/2012 | Goelz et al. |
| 2014/0084165 | A1 * | 3/2014 | Fadell ....................... H02J 3/00 250/340 |
| 2015/0109104 | A1 * | 4/2015 | Fadell ................... G08B 27/005 340/5.7 |
| 2015/0253793 | A1 | 9/2015 | Matesa, Jr. |
| 2016/0252487 | A1 | 9/2016 | Bhide |
| 2017/0077693 | A1 | 3/2017 | Lermann |
| 2017/0180046 | A1 | 6/2017 | Stout et al. |
| 2020/0007538 | A1 | 1/2020 | Mehta |
| 2021/0124327 | A1 | 4/2021 | Parfitt |
| 2023/0004136 | A1 * | 1/2023 | Parfitt ........................ G01J 5/12 |
| 2023/0138366 | A1 * | 5/2023 | King ...................... H01R 33/90 439/620.21 |

FOREIGN PATENT DOCUMENTS

| | | | | |
|---|---|---|---|---|
| CN | 202190053 | U | 4/2012 | |
| CN | 102957061 | A | 3/2013 | |
| CN | 203071555 | U | 7/2013 | |
| CN | 203932535 | U | 11/2014 | |
| CN | 104425150 | A | 3/2015 | |
| CN | 105793904 | A | 7/2016 | |
| CN | 106548591 | A | 3/2017 | |
| CN | 107689132 | A | 2/2018 | |
| CN | 108022397 | A | 5/2018 | |
| DE | 202012008085 | U1 * | 11/2012 | ............ G08B 17/06 |
| EP | 1354330 | B1 * | 4/2010 | ........... H01R 13/713 |
| EP | 2701244 | A2 | 2/2014 | |
| EP | 3252883 | A1 | 8/2019 | |
| FR | 2972542 | A1 | 9/2012 | |
| GB | 2551857 | A | 1/2018 | |
| GB | 2572778 | A | 10/2019 | |
| GB | 2599142 | A * | 3/2022 | ........... G08B 17/125 |
| GB | 2609519 | A | 2/2023 | |
| GB | 2616881 | A * | 9/2023 | ............. H01R 13/66 |
| JP | H08275379 | A | 10/1996 | |
| JP | H09223286 | A | 8/1997 | |
| JP | H09289731 | A | 11/1997 | |
| JP | 2000348825 | A | 12/2000 | |
| JP | 2007312945 | A | 12/2007 | |
| JP | 2009112115 | A | 5/2009 | |
| JP | 3168207 | U | 6/2011 | |
| JP | 2012043665 | A | 3/2012 | |
| JP | 2013004394 | A * | 1/2013 | |
| JP | 2013149059 | A | 8/2013 | |
| KR | 100929818 | B1 | 12/2009 | |
| KR | 1020160015472 | A | 2/2016 | |
| WO | 2007120914 | A2 | 10/2007 | |
| WO | 2011046265 | A1 | 4/2011 | |
| WO | 2012056084 | A1 | 5/2012 | |

OTHER PUBLICATIONS

Chinese First Office Action dated Dec. 20, 2021 in Chinese Application No. 201980058889.X with English translation (27 pages).
Japanese Notification of Refusal with translation in Japanese App. No. 2021-525385 dated Feb. 28, 2023, 17 pages.
DigiKey Panasonic "Panasonic Infrared Array Sensor Grid-EYE (AMG88)". Retrieved from Internet: < https://mm.digikey.com/Volume0/opasdata/d220001/medias/docus/1244/Grid-EYE_AMG88.pdf> (Year: 2016), 2 pages.
Examiner Report in Saudi Arabian Application No. 521421021 received Dec. 22, 2023, 8 pages.
Examiner Report in Saudi Arabian App. No. 522440425, dated Dec. 22, 2023, 6 pages.
Japanese Notification of Refusal with translation in Japanese App. No. 2023-087291 mailed Apr. 2, 2024, 7 pages.

* cited by examiner

ELECTRICAL APPLIANCE WITH SENSORS FOR DETECTING HAZARDS

CROSS-REFERENCE TO RELATED APPLICATIONS

The present applications is a national-phase application, under 35 U.S.C. § 371, of International Application No. PCT/GB2019/051986, filed on Jul. 16, 2019, which in turn claims priority to GB Application No. 1811648.3, filed on Jul. 16, 2018. Each of these applications is incorporated herein by reference in its entirety for all purposes.

TECHNICAL FIELD

The present invention relates to an electrical safety device for detecting the presence of an electrical hazard and a system of a plurality of interconnected electrical safety devices for detecting and addressing an electrical hazard.

BACKGROUND

Fire risks due to faulty household appliances have become an increasing concern in recent years. It has been reported that 40% of accidental house fires are caused by electrical appliances and supply. Many of these fires are due to small electrical surges or changes in ambient conditions which, if detected and addressed at an earlier stage, could be mitigated. As such, in the modern age where an increasing proportion of household devices require constant electrical connectivity, measures must be taken to ensure the safety of users and residents of households utilising such appliances.

One approach is to install in the household a sensor to detect parameters indicating the presence of a fire (such as smoke, CO, $CO_2$ or hazardous gas). These sensors are able to sense risks of fire and sound an alarm to warn nearby residents. However, often by the time such indications are identified, a fire has already started and therefore it is too late to completely prevent damage and eliminate the danger to the occupants of a building. Furthermore such an approach is not always guaranteed to attract the attention of nearby residents, and it has been shown such a system does not dramatically reduce the occurrence of a household fire. Moreover, if the resident of the household is absent, there is often no way for a resident to know what is happening in the household, and it may be weeks before the resident actually finds out about the detected parameters and the potentially devastating effects of the fire.

There is therefore a need for a system capable of detecting a potential fire risk at an earlier stage and preventing or mitigating the effects of a fire risk once detected.

The present invention seeks to address at least some of the above problems.

SUMMARY OF THE INVENTION

An electrical safety device according to the present invention comprises a socket arranged to receive an electrical plug of an electrical appliance to connect a current supply to the electrical appliance; a thermal sensor arranged to detect the surface temperature of an electrical plug when received in the socket; and a processor in communication with the thermal sensor, the processor configured to determine when the sensed surface temperature exceeds a predetermined threshold.

By detecting the surface temperature of the electrical plug of an appliance and identifying when the surface temperature exceeds a predetermined threshold the electrical safety device according to the present invention can identify a possible hazard at an earlier stage than conventional electrical hazard detection methods.

Although the thermal sensor is configured to detect the surface temperature of an electrical appliance it is equally able to detect the presence of a flame or rise in ambient temperature. The thermal sensor is preferably arranged to detect the surface temperature of at least one, preferably both of, an electrical plug housing and cable.

The processor may be configured to determine when the surface temperature displays behaviour indicative of a potential electrical hazard. For example it may be configured to determine when temperature gradients across the surface of the housing and/or cable of the electrical plug exceed a certain level, when the surface temperature distribution across the plug displays a particular behaviour or the rate of change of the surface temperature displays a particular behaviour. The processor may use a machine learning algorithm and may be trained to identify such behaviour indicative of particular hazard. The electrical safety device may additionally include a memory configured to hold data relating to surface temperature behaviour associated with particular hazard wherein the processor is configured to receive surface temperature data from the thermal sensor and compare this against the data stored in the memory to determine the presence of a hazard. The processor may be configured to determine the presence of hazard based on the output of the thermal sensor in combination with one or more sensors, for example a machine learning algorithm may determine the presence of a hazard based on the output of a combination of sensors.

Preferably the thermal sensor is an infrared sensor such as an infrared thermal imaging sensor. In particular, preferably the thermal sensor is an infrared camera comprising an array of thermopile detector pixels. In this way a highly accurate reading of surface temperature can be determined so as to identify the hazard reliably. The use of thermal imaging allows for the distribution and change in thermal temperature to be measured, allowing for more information to be gathered to provide a more reliable identification of an electrical hazard at an earlier stage.

Preferably the thermal sensor comprises a lens providing a wide field of view, for example between 30 and 90 degrees, preferably around 60 degrees.

Preferably the thermal sensor is configured to provide a contactless measurement of the surface temperature of an electrical mains plug when received in the socket. This provides a more accurate means of identifying the temperature and avoids the need for a sensor to be accurately positioned to come into contact with the mains plug, which can result in an unsuccessful measurement should the sensor shift slightly over the lifetime of the device.

Preferably the electrical safety device includes a housing wherein the socket is provided in a surface of the housing; wherein the thermal sensor is arranged to detect the temperature in a region external to the housing at the position of the socket. By taking a measurement of the portion of the plug which is external to the electrical safety device (i.e. the plug housing rather than the prongs), the measurement is not affected by the heat of the electrical components of the electrical safety device itself and it allows for imaging of a substantial part of the plug body, where a fire is most likely to start and/or spread.

Preferably the socket comprises a plurality of recesses and the thermal sensor is arranged within the housing between the socket recesses and directed out of the housing so as to detect the temperature of the underside surface of a mains plug when received in the socket. Alternatively the thermal sensor is provided on a surface of the housing adjacent to the socket and the thermal sensor is directed along the outer surface of the housing to detect the temperature of a side surface of a mains plug and the connected cable when received in the socket. Both arrangements allow for a substantial portion of the plug housing to be imaged to accurately determine a surface temperature measurement. The latter allows for the placement of the thermal sensor a greater distance from the plug allowing a greater portion of the plug to be measured. The former allows for the thermal sensor to be housed fully within the housing of the electrical safety device such that it is protected.

In one example the electrical safety device is a plug-in adaptor unit further comprising: a plug part arranged to be received in a mains electrical socket, the plug part positioned relative to the socket such that an electrical mains plug of an electrical appliance can be received in the socket of the electrical safety device when the plug part is received in a mains socket. This allows for the electrical safety device to be used with existing mains sockets in a building by simply plugging the plug part of the adaptor unit into the mains socket and plugging an appliance to be monitored into the socket of the adaptor unit.

In another example the electrical safety device is a mains socket faceplate. Preferably the main socket faceplate is configured to be mounted on a surface such as a wall to interface with the mains electrical wiring. In particular the electrical safety device is a main socket fascia unit which may be installed in a building in the place of conventional mains socket units for example by screwing the device to the wall at the electrical access points. This allows for the electrical safety device to be installed throughout a building to monitor all electrical appliances.

Preferably the electrical safety device further includes a relay switch configured to disconnect the mains current supply to an electrical appliance connected to the electrical safety device when the processor determines that the surface temperature of the plug exceeds the predetermined threshold. In this way, if the temperature of the plug of an electrical appliance reaches a level deemed to be hazardous, the electrical safety device can block the supply of current to the appliance, thereby addressing the hazard.

The electrical safety device may have one, two or more sockets, each of which may have its own current sensor and relay switch.

Preferably the electrical safety device comprises one or more wireless communications links configured to communicate with a remote device. This allows the electrical safety device to be employed in an electrical safety system (i.e. an electrical safety device network) throughout a building to identify risks, alert a user and address the risks. Preferably the electrical safety device is configured to communicate with other electrical safety devices and/or remote devices both by a Wi-Fi® network and a narrow band radio frequency network. This provides contingency in the case of failure of one of the networks.

Preferably the electrical safety device comprises one or more additional local sensors, the one or more local sensors comprising one or more of: a smoke and/or gas sensor; a carbon monoxide sensor; a moisture and/or water sensor; and a current sensor, allowing the device to sense the presence of a greater range of hazard and identify hazards more reliably. In preferable examples the electrical safety device includes each of a smoke and/or gas sensor; a carbon monoxide sensor; and a current sensor; wherein the processor is configured to determine whether corresponding parameter sensed by each sensor exceeds a predetermined threshold value. This combination of sensors allows for substantially all household hazards relating to electrical equipment to be identified reliably. Preferably the processor is configured to identify the presence of a hazard based on the output of a combination of sensors. In particular the processor uses a combination approach in which the output of a plurality of sensors is used to more reliably identify a risk. For example, the processor may employ a machine learning algorithm which uses the output of a plurality of sensors to identify a risk. In this way, a hazard can be identified more reliably than when based on the output of a single sensor. For example a combination of the output of the current sensor and thermal sensor can be used to more reliably identify the presence of an electrical fault.

The electrical safety device is configured such that each sensed parameter has a corresponding threshold or behaviour indicative of the presence of a hazard. The device may include a memory which stores data comprising such threshold values and behaviour change patterns such that the processor can compare the sensed parameters against the corresponding data to identify the presence of a potential risk. Similarly, the processor can compare the behaviour of a combination of sensed parameters against response data stored in the memory to more reliably identify the presence of a hazard than when based on the output of a single sensor.

The device may additionally include a water sensor; wherein the electrical safety device comprises a main body housing the socket, the thermal sensor and the processor; and the water sensor is arranged to be positioned on a surface below the main body of the electrical safety device wherein the water sensor is connectable to the main body by a cabled or wireless connection. This allows for leaking water to also be identified which can be particularly hazardous when in combination with an electrical fault. The processor may be configured to analyse the response of the water sensor in combination with one or more other sensors to more reliably determine the presence of a hazard.

The electrical safety device preferably further comprises means to provide an alert to a user. The device may include an alarm sounder or visual alarm to notify a user when the processor determines that a sensed parameter exceeds a threshold value. The device preferably is also configured to send an alert to a user device such as a smart phone to notify a user of the location and type of hazard identified. The device may also be configured to notify a voice assistant (such as Apple™ Siri, Google™ Assistant, Microsoft™ Cortana, Amazon™ Alexa) to notify a user and provide information on the hazard and directions such as a route to exit the building.

The electrical safety device provides further advantages when provided in an electrical safety system including one or more electrical safety devices and one or more remote devices. In this way the devices can communicate to notify a user of the risk and take action automatically or when prompted by a user to address the hazard.

In another aspect of the invention there is provided an electrical safety system comprising: an electrical safety device according to any preceding claim; and one or more remote devices; wherein the electrical safety device comprises a communications link and the electrical safety device is configured to send a signal to the remote device using the communications link when the processor determines that the surface temperature of the mains plug has exceeded the predetermined threshold.

In this way, the remote device can either alert a user or take action to address a potential hazard. A remote device includes another other device connected to the network which is not an electrical safety device as described above, for example a smartphone, smart television, voice assistant device or other smart user device; a remotely controlled valve; a router or hub; a docking station for a mobile phone; a fire alarm; a smoke alarm; a sprinkler system.

Preferably the communications link comprises a wireless communications link, wherein the wireless communications link is preferably provided by one or more of: a narrow band radio frequency network, a Wi-Fi® wireless communications link, and a Bluetooth® wireless communications link. The electrical system may comprise one or more electrical safety devices and one or more remote devices, wherein the electrical safety devices and remote devices form a mesh network in which the electrical safety devices and remote devices can communicate. In this way, each device can communicate with the other devices such that coordinated actions and alerts can be provided. Preferably the electrical safety devices and remote devices are configured to communicate both by a Wi-Fi® network and a narrow band radio frequency network to provide contingency in case one network goes down. The narrow band radio frequency network may specifically a 868 MHz band.

Preferably at least one remote device comprises a smart user device and the smart user device is configured to provide an audio or visual alert after receiving a signal from the electrical safety device. For example a smart phone may run software configured to operate with the electrical safety system. The software may display alerts to a user, identify the location of an identified risk, provide details of the identified risk, allow a user to choose an option to address the risk such as shutting off a mains or local supply of gas, water, electricity, activate a sprinkler system, call the fire brigade or turn an appliance off.

Preferably at least one remote device comprises a voice assistant device (such as Apple™ Siri, Google™ Assistant, Microsoft™ Cortana, Amazon™ Alexa) where the voice assistant device is configured to notify a user upon receiving a signal from the electrical safety device. The voice assistant device may be configured to provide one or more of: information on the type and location of the hazard, provide options for responding (e.g. call emergency services, activate an isolation device) or information on how to safely exit the building to avoid the hazard.

Preferably at least one remote device comprises an isolation unit comprising a communications link; wherein the isolation unit is configured to restrict a flow of water, gas or electricity through the isolation unit upon receiving a signal from the electrical safety device. In this way, an isolation unit can receive a communication from an electrical safety device that an appliance is exhibiting behaviour indicative of a fault and the isolation device can take action to restrict or prevent the flow of services to that specific appliance, to a part of the building or to the building as a whole.

The isolation units may take several different forms. In one example, at least one isolation unit comprises a local water isolation unit arranged for installation at the local water connection to an electrical appliance; the local water isolation unit comprising: a cabled or wireless connection for connecting to the electrical safety device; and a motorised valve; wherein the local water isolation unit is configured to close the motorised valve to restrict the water supply to the electrical appliance upon receiving a signal from the electrical safety device. In this way, the water supply to a particular appliance, group of appliances or region of a building can be restricted to prevent flooding or an electrical fault being spread by water.

Preferably at least one isolation unit comprises a mains supply isolation unit comprising: at least one motorised valve arranged for installation in a mains water feed, a header water tank or mains gas supply; wherein the mains supply isolation unit is configured to close the motorised valve to restrict the mains supply upon receiving a signal from the electrical safety device. Preferably at least one isolation unit comprises a mains electrical isolation unit comprising: a mains electrical shut off switch; wherein the electrical isolation unit is configured to actuate the electrical shut off switch to shut off the mains electricity upon receiving a signal from the electrical safety device. Using these mains isolation units the further supply of gas, electricity or water throughout the building or to a specific zone in a building can be stopped to prevent a hazard escalating.

The main electrical isolation unit may be connected to a mains consumer unit and is configured to actuate a main switch on the mains consumer unit to shut off the main electricity supply. Alternatively the mains electrical isolation unit may be integrated within the consumer unit or fuse box.

The isolation unit may include one or more local sensors to identify a local hazard. Preferably the isolation unit comprises a processor and one or more of: a thermal sensor; a smoke and/or gas sensor; a carbon monoxide sensor; a moisture and/or water sensor; a current sensor; wherein the isolation unit is configured restrict a flow of water, gas or electricity when the processor determines that a parameter sensed by a local sensor exceeds a predetermined threshold.

In another example of the invention there is provided an electrical appliance with an integrated electrical safety device to monitor the temperature of the internal components of the electrical appliance and identify a potential hazard.

In particular there is provided an electrical appliance comprising: a housing; electrical components within the housing configured to provide a function of the electrical appliance; a thermal sensor arranged to detect the surface temperature of the electrical components; and a processor in communication with the thermal sensor, the processor configured to determine when the sensed surface temperature exceeds a predetermined threshold.

Preferably the thermal sensor is an infrared sensor such as an infrared thermal imaging sensor. In particular, preferably the thermal sensor is an infrared camera comprising an array of thermopile detector pixels. In this way a highly accurate reading of surface temperature of the internal electrical components can be determined using a non-contact measurement so as to identify the hazard reliably. The use of thermal imaging allows for the distribution and change in thermal temperature to be measured, allowing for more information to be gathered to provide a more reliable identification of an electrical hazard at an earlier stage. Preferably the thermal sensor comprises a lens providing a wide field of view, for example between 40 and 80 degrees, preferably around 60 degrees.

Preferably the thermal sensor is configured to provide a contactless measurement of the surface temperature of the internal electrical components during use of the electrical compliance. This provides a more accurate means of identifying the temperature and avoids the need for a sensor to be accurately positioned in contact with the electrical components, which can result in an unsuccessful measurement should the sensor shift slightly over the lifetime of the device. Thermal imaging allows for more information to be collected in a non-contact method and the risk of a fire within an appliance to be identified by certain indicative behaviour in the surface temperature of the electrical components.

The electrical appliance is preferably one of a microwave, a gas or electric oven, a boiler, a consumer unit, a dishwasher, a fridge and/or freezer, a washing machine a tumble drier.

The internal electrical components preferably comprise one or more of: a motor, a compressor, a heater, a power source, a fuse, electrical circuitry or any other components which may overheat.

The thermal sensor is preferably mounted within the housing of the electrical appliance so as to face the internal electrical components without being in contact. Preferably the thermal sensor is a thermal camera so as to image a substantial portion of the surface area of the internal electrical components.

The processor of the electrical appliance may be configured to determine when the surface temperature displays behaviour indicative of a potential electrical hazard. For example it may be configured to determine when the temperature gradients exceed a certain level, when the surface temperature distribution across the plug displays a particular behaviour or the rate of change of the surface temperature displays a particular behaviour. The processor may use a machine learning algorithm and may be trained to identify such behaviour indicative of particular hazard. The electrical safety device may additionally include a memory configured to hold data relating to surface temperature behaviour associated with particular hazard wherein the processor is configured to receive surface temperature data from the thermal sensor and compare this against the data stored in the memory to determine the presence of a hazard.

The electrical appliance preferably further comprises one or more wireless communications links configured to communicate with an electrical safety device as defined above and/or remote device. This allows the electrical appliance to be employed in an electrical safety system (as described above) throughout a building to identify risks, alert a user and address the risks. Preferably the electrical appliance is configured to communicate with other electrical safety devices and/or remote devices both by a Wi-Fi® network and a narrow band radio frequency network. This provides contingency in the case of failure of one of the networks.

Preferably the electrical appliance comprises one or more local sensors. the one or more local sensors comprising one or more of: a smoke and/or gas sensor; a carbon monoxide sensor; a moisture and/or water sensor; a current sensor; wherein the isolation unit is configured restrict a flow of water, gas or electricity when the processor determines that a parameter sensed by a local sensor exceeds a predetermined threshold.

All of the functionality described above with respect to the electrical safety device can also be implemented in the electrical appliance with an internal thermal sensor. The electrical appliance can also form part of the electrical safety system described above.

BRIEF DESCRIPTION OF THE DRAWINGS

Embodiments of the invention will now be described, by way of example only, with reference to the accompanying drawings, in which.

DETAILED DESCRIPTION

Figure 1:
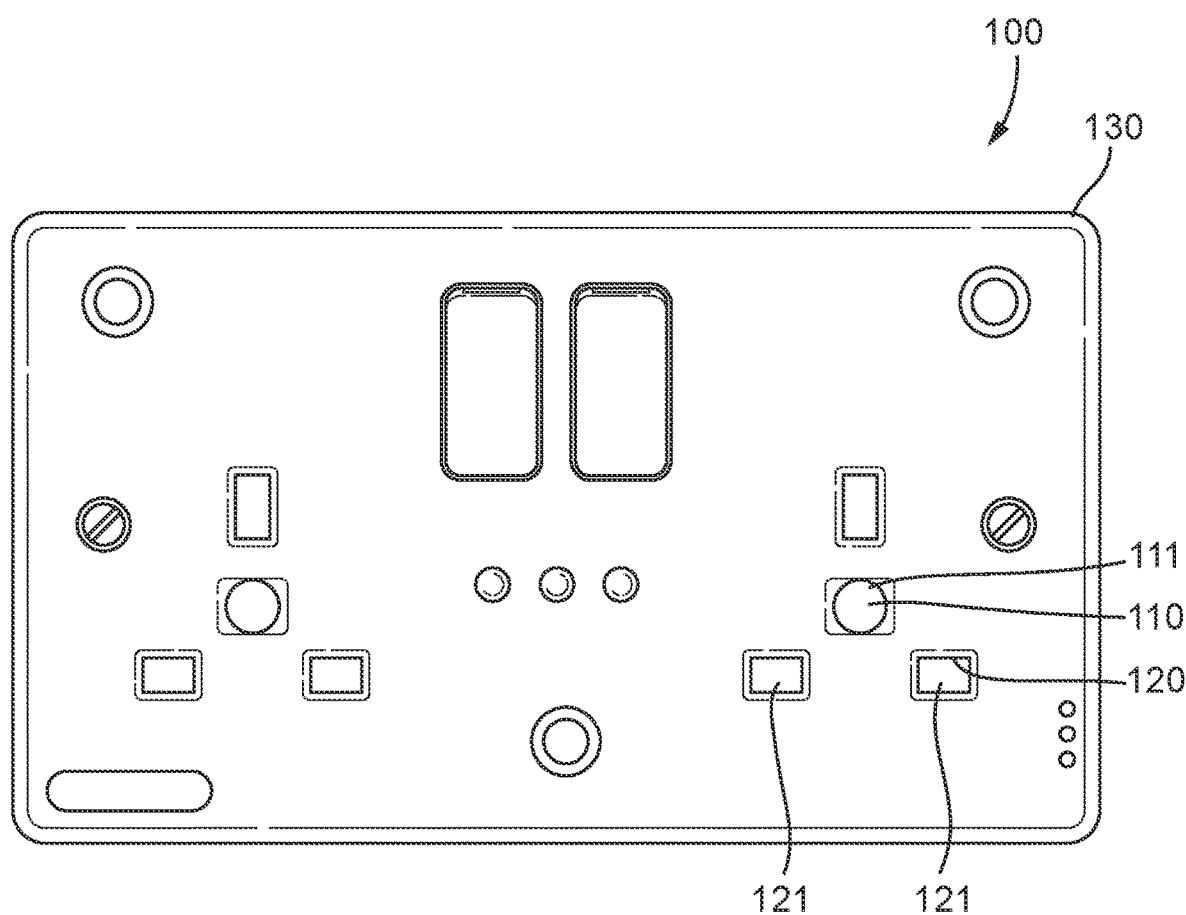
FIG. 1 schematically illustrates an electrical safety device according to the present invention in the form of a main socket faceplate.

FIG. 1 illustrates an electrical safety device 100 according to the present invention. The electrical safety device 100 includes a socket 120 arranged to receive an electrical plug of an electrical appliance and a thermal sensor 110 arranged to detect the surface temperature of an electrical plug when it is received in the socket 120 of the electrical safety device 100. The electrical safety device 100 further includes a processor (internal to the device and not pictured) which is in communication with the thermal sensor 110 and is configured to determine when the sensed surface temperature of an electrical plug received in the socket 120 exceeds a predetermined threshold. Since the thermal sensor 110 is arranged to detect the surface temperature of an electrical plug received in the socket 120, the electrical safety device 100 allows for early detection of hazardous conditions which could result in a fire. In particular, a primary cause of house fires is the overheating due to an electrical fault in an electrical appliance. Such electrical faults can be determined by an increased in surface temperature of the mains plug connection such that, by monitoring this parameter, electrical faults can be detected before they escalate.

The electrical safety device 100 may further comprise a range of functionality to provide various responses when the processor determines that the sensed surface temperature of an electrical plug exceeds the predetermined threshold. In particular, the electrical safety device further includes an internal alarm sounder to provide an alert when a plug received in the socket 120 exceeds the predetermined threshold, therefore indicating a risk of fire. The device 100 may include a relay switch for stopping current flow to the appliance through the electrical safety device 100. The device 100 further includes wireless communication functionality in order to send alerts to a user device such as a smartphone and to take various actions to mitigate the risk, including switching off the water or gas supply. This extended functionality of the electrical safety device 100 will be described in more detail below.

Thermal Sensor

As described above, the thermal sensor 110 is configured so as to detect the temperature in a region corresponding to the electrical plug when received in the socket 120 in order to sense the surface temperature of the electrical plug. The thermal sensor 110 is provided by an infrared sensor, in particular an infrared camera comprising an array of infrared detector pixels. The infrared array sensor may comprise an 8×8 grid array of thermopile elements that detect absolute temperature by measuring the emitted infrared radiation. This infrared array sensor is able to provide thermal images by measuring actual temperature and temperature gradients, allowing highly precise measurements of surface temperature and identification of changes in temperature. The infrared array sensor preferably also includes a lens to provide an increased viewing angle such that a large area of the electrical plug can be imaged even when the thermal sensor 110 is positioned a short distance away. The lens may comprise an integral silicon lens which provides a viewing angle of around 60 degrees. The thermal sensor 110 is preferably configured to detect temperature changes over a range of −20° C. to 100° C., allowing for tracking of the surface temperature of the electrical plug as it begins to heat up in the case of an electrical fault. The thermal sensor 110 may be for example a Panasonic grid-EYE® sensor, generally used for movement detection, occupancy detection, people counting and lighting control.

The thermal sensor 110 is arranged to provide a contactless temperature measurement of the electrical plug of an electrical appliance when connected to the socket 20. The use of contactless thermal imaging allows for imaging of the electrical plug as a whole, allowing for temperature changes to be detected across the plug rather than from single point as necessitated by a contact measurement. Furthermore, a contact measurement requires that a contact temperature sensor is provided so as to remain in contact with the electrical plug when it is received in the socket 120. If the contact temperature sensor is dislodged out of place such that it is no longer in contact with the electrical plug it will no longer provide an accurate temperature measurement such that there is a risk that a hazardous fault in the electrical appliance will not be detected. An infrared array sensor also provides for the possibility of more complex processing carried out on the thermal image received by the sensor. For example, more advanced machine learning based algorithms can be used to detect temperature change patterns which are indicative of a high risk fault in the appliance.

The thermal sensor may be positioned in a number of different ways to achieve the reading of surface temperature of the electrical plug. In FIG. 1 the thermal sensor 110 is positioned within the housing 130 of the device 100 between the recesses 121 forming the socket 120. In particular, there is an opening 111 in the surface of the housing 130 in a central position of the socket 120, between the recesses in which the pins of an electrical plug are received. The thermal sensor 110 is positioned within the housing facing out of the housing 130 of the device 100. In this way, the thermal sensor 110 images the base surface of the plug when received in the socket 120. The opening 111 may be larger than the IR sensitive array of the thermal sensor 110 and the thermal sensor may be recessed within the housing facing through the opening so as to provide a wider field of view of the underside surface of a plug received in the socket portion 120. In this way, the thermal sensor can provide a contactless measurement of the surface temperature of a region of the underside surface of a plug received in the device 100. The thermal sensor 110 may equally be placed in a number of alternative locations so as to provide a contactless surface temperature measurement of the electrical plug received in the electrical safety device 100.

Figure 2:
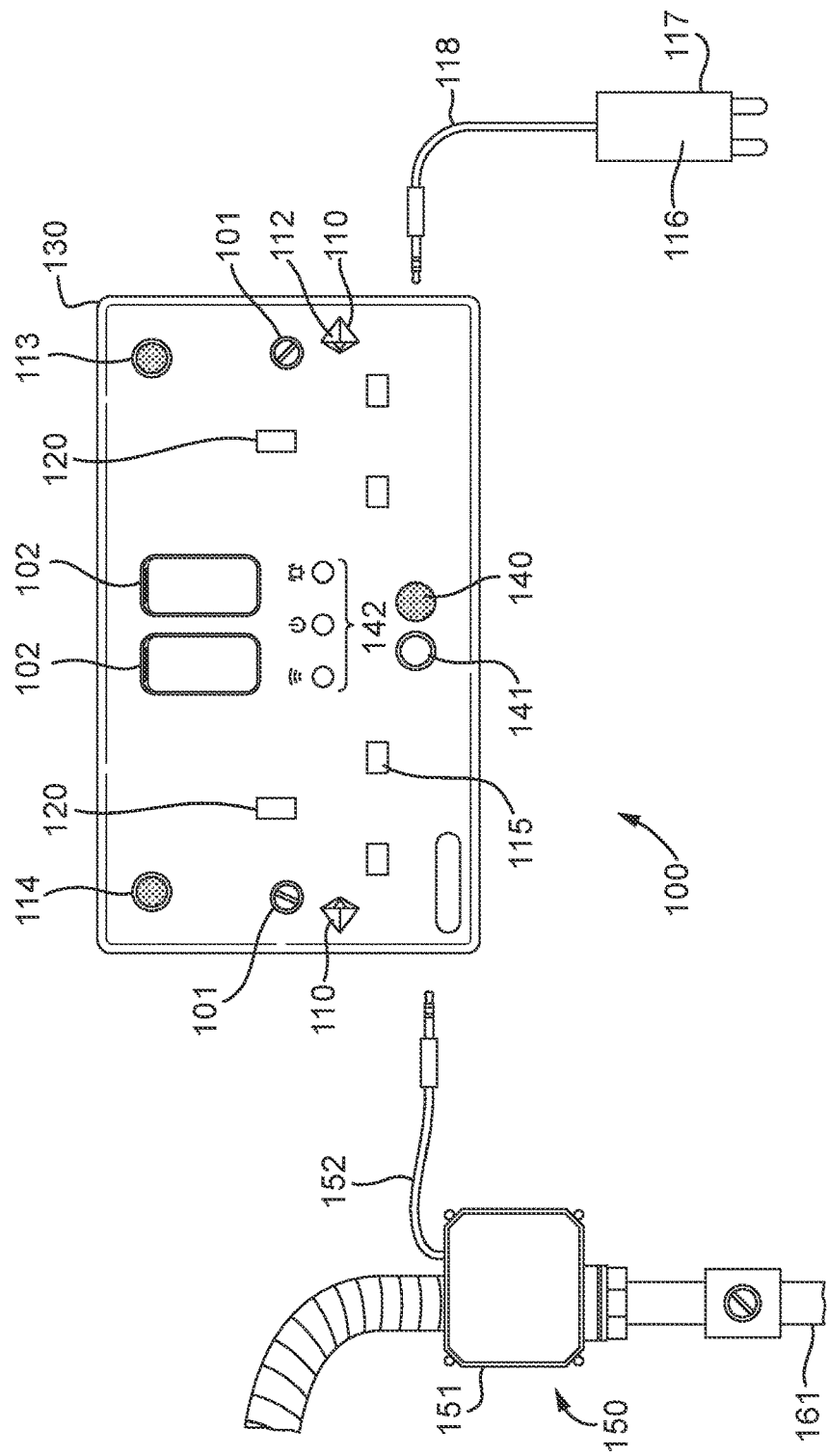
FIGS. 2A and 2B schematically illustrate an electrical safety device according to the present invention in the form of a main socket faceplate.
Figure 3:
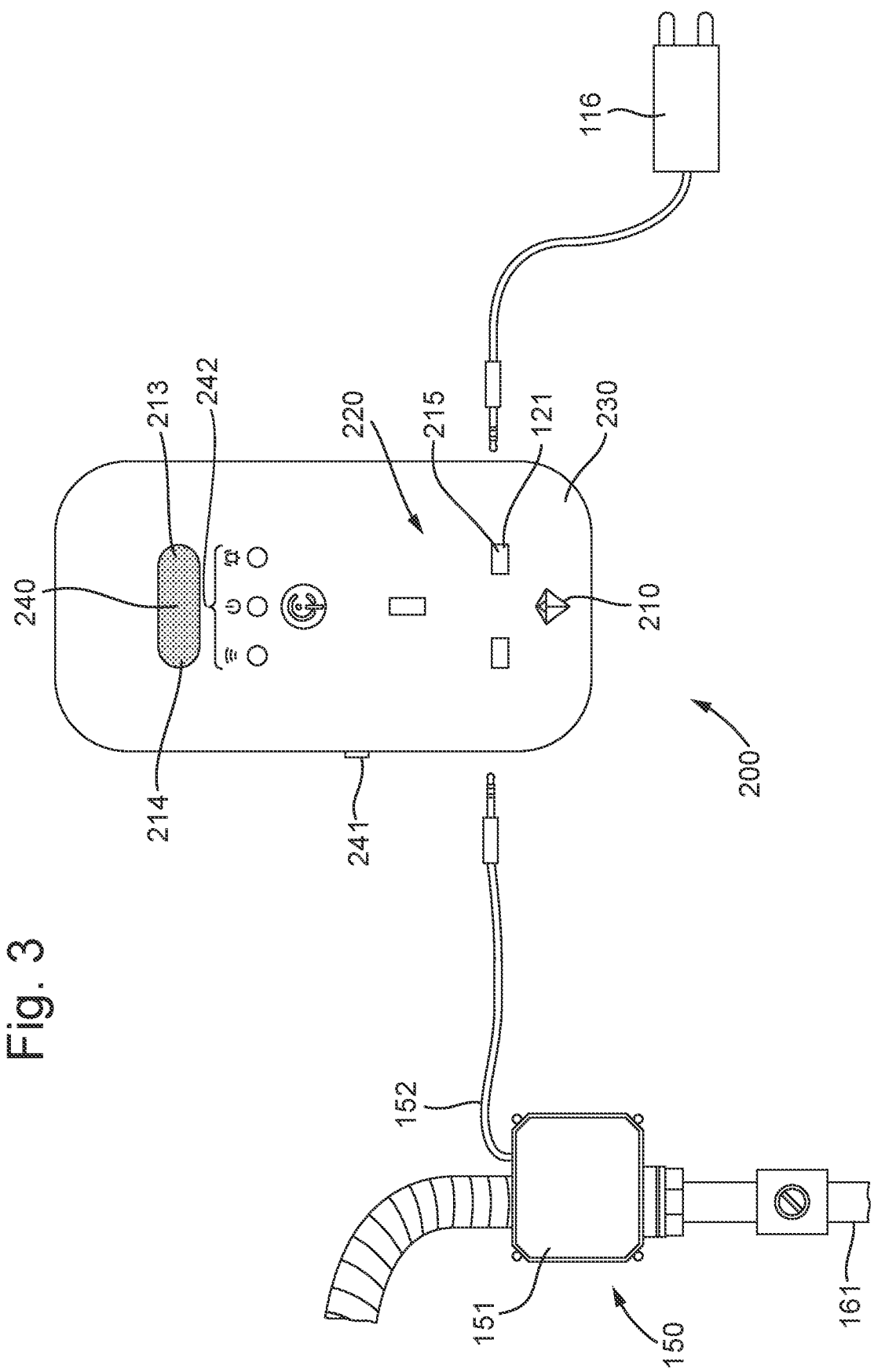
FIG. 3 schematically illustrates an electrical safety device according to the present invention which takes the form of a plug-in adaptor unit.

FIGS. 2 and 3 illustrate an alternative possibility in which the thermal sensor 110 is positioned on the surface of the housing 130 directed along the surface 131 of the housing 130 so as to measure the surface temperature of the electrical plug. In particular, the thermal sensor 110 may be moulded within the housing 130 of the electrical safety device 100. In this example the housing 130 comprises an integral protruding portion 112 in the surface 131 which houses the infrared sensor so as to direct it along the face of the housing 130 towards the socket portion 120. FIG. 2B shows a side profile view of the electrical device 100 of FIG. 2A. The protruding housing portion 112 is visible in the surface 131 of the housing 130. The thermal sensor 110 is held within this protruding housing portion 112 so as to be aligned approximately parallel with the surface of the housing 130. The sensor 110 may be positioned at any point around the socket portion 120, for example directed at the socket 120 from the side as shown in FIG. 2A, from below as shown in FIG. 3 or from above. Positioning the sensor in this way so as to be directed along the surface of the housing allows the sensor to be distanced from the plug so as to image a wider field of view around the plug when received in the socket. Given the lens of the thermal sensor 110 provides a field of view of around 60°, a substantial portion of the electrical plug can be imaged to detect rising temperature gradients as they arise, allowing more accurate detection of temperature rises associated with electrical faults.

Although the thermal sensor 110 is primarily configured for detection of surface temperature, which allows an early detection of possible faults, before they result in significant temperature rises leading to sparks or flames, the thermal sensor can clearly equally detect the presence of such sparks or flames as they arise in the plug due to significant emission of IR radiation. The thermal sensor 110 therefore allows for the early detection of temperature increases associated with possible hazardous faults within the device and the device can provide various alerts and actions to minimise the risk of such faults, as will now be described.

Mains Socket Faceplate Device

FIG. 2A illustrates various further functionality of an electrical safety device according to the present invention. The electrical safety device 100 shown in FIGS. 1 and 2A is a mains socket faceplate 100, which is configured to be mounted at an electrical connection point on a wall or other surface, for example using screws 101. The main socket face plate safety device 100 of FIGS. 1a and 2A comprises a substantially flat body defined by a housing 130, as in a conventional main socket face plate or fascia. The electrical safety main socket face plate 100 is configured to be positioned in place of a conventional main socket face plate at the electrical access points in a building to provide enhanced safety against the risk of fires and electrical faults. In the example of FIG. 1 and FIG. 2A the main socket face plate 100 comprises two sockets 120 but such electrical safety devices could equally have a single socket 120 or a greater number of sockets 120. Similarly, although the device 100 of FIGS. 1 and 2A is in the form of a face plate configured to be attached to a wall or other surface, it might equally be provided as a moveable extension socket configured to be attached via a cable to a mains socket.

The main socket face plate device 100 includes switches 102 to switch on the current supply to the corresponding socket 120, as in a conventional mains socket face plate. In use, the main socket face plate device 100 is attached to a wall by screwing it into place using screws 101, in place of a conventional main socket face plate. An electrical appliance is plugged into a socket 120 of the device 100 and current supplied by switching switch 102 to the on position. The surface temperature of an appliance plug plugged into the socket 120 is monitored by the thermal infrared sensor 110 facing along the surface of the housing 130 directed at the socket 120. When a specific temperature or change in temperature is identified by the processor (not shown) the device 100 determines the presence of a possible risk and can take a number of actions. The electrical safety device 100 firstly comprises an internal alarm sounder 140 which is configured to sound when a hazard is detected in order to alert the occupants in the surrounding area. Furthermore, the electrical safety device comprises a wireless communications link configured to communicate with one or more remote devices. In particular, the device 100 is configured to communicate via the communications link to a user device such as a smartphone in order to alert a user of the presence of a potential electrical fault and provide further information regarding the type of hazard detected and its position within the building.

The device 100 contains a reset switch 141 for resetting the device 100 or silencing the alarm 140 when it is sounding. The electrical safety device 100 further comprises a series of status LEDs to indicate to a user that the device 100 is functioning correctly. In particular the device of FIG. 2A includes a corresponding LED to indicate the status for the network connectivity, the power to the device and the sounding of the alarm. The series of LEDs 142 are provided on the surface of the housing 130 to provide visual alert to the user. The electrical safety device may equally be configured to communicate via the wireless communications link with other user devices such as a smart TV, smart watch or other devices to indicate the presence of a potential hazard and provide details on the hazard detected.

Additional Sensors

In addition to the thermal sensor 110 the electrical safety device 100 comprises a number of additional sensors to detect the presence of a hazard. In particular, the electrical safety device comprises a smoke and gas sensor 113 configured to detect smoke from any electrical device connected to the electrical safety device 100 or smoke and gas in the vicinity of the device 100. The electrical safety device 100 also includes a carbon monoxide sensor 114 configured to detect carbon monoxide in the vicinity of the electrical safety device 100, for example from gas fires or boners. The device 100 further includes a current sensor 115 for monitoring the current supplied to an electrical appliance plugged into the electrical safety device 100. The current sensor is positioned within the device to measure current between the pins of a plug and the corresponding contact within the body of the device 100.

Each of the sensors are electrically connected to the processor within the device such that the processor can calculate whether any of the sensed parameters are indicative of a potential hazard. The processor is configured to determine the presence of a potential hazard by identifying when the value of a sensed parameter exceeds a predetermined threshold value. However more complex processing may be used to identify the presence of a hazard, for example by identifying a rate of change of a sensed parameter or where a sensed parameter change displays a particular behaviour or pattern associated with an increased risk of a hazard. The processor can also be configured to determine the presence of a hazard based on a combination of sensor outputs in order to identify a risk more reliably. For example the processor can use more complex algorithms, such as machine learning based algorithms which take the output from multiple sensors in order to determine an elevate risk. For example in a situation where the current sensor and thermal sensor readings are lower than their corresponding individual thresholds, the behaviour of the sensor readings in combination may signify a developing hazard an therefore this can be detected at an earlier stage than with a single sensor. Similarly an unusual rate of chance of one or more parameters may indicate the presence of a hazard. The device 100 may include an internal memory holding such sensor parameter data with the processor configured to compare the received data with data indicative of a hazard held in the memory in order to identify the presence of a hazard. The processor may use more complex algorithms such as machine learning algorithms which can be trained to identify changes in the parameters associated with increased risks of a potential hazard. For example, the machine learning algorithm may include a neural network (or support vector machine) which functions to receive the data from the sensors as inputs and, once trained on a set of simulated hazards, may be able to identify a real-life hazard from a combination of inputs from the sensors using weights and thresholds that may not be set of predetermined by the operator. In another example, a linear regression model may be used to identify changes of parameters over time to predict or estimate a level of risk.

The electrical safety device 100 can also include a water sensor 116 arranged to detect the presence of water in the vicinity of the device 100, as shown in FIG. 2A. In particular the water sensor 116 may comprise a water sensor body 117 arranged to lie on the ground below the electrical safety device 100 so as to detect collecting water on a surface below the device 100. The water sensor body 117 is connected to the device by a water sensor connection 118 as shown in FIG. 2A. The connection 118 may comprise a plug which plugs into a corresponding socket on the side of the device to connect the water sensor to the internal processor such that the processor can receive signals from the water sensor to identify the presence of water and alert a user using the alarm or wireless communications link to a user device. The presence of water may be particularly hazardous when there is an electrical fault with the appliance and the additional water sensor 116 can detect the presence of a leak from a household appliance or mains water in order to identify such a hazard.

In addition to providing an alarm or sending an alert to a remote device such as a smartphone, the electrical safety device 100 can also take actions automatically, or when prompted by a user, to respond to the detected hazards. In this way, the electrical safety device 100 forms part of an electrical safety system which can detect a hazard, alert a user and take appropriate action to address the hazard.

The electrical safety system further comprises one or more remote devices which, in the example of FIG. 2A, is in the form of an isolation unit 150. The system may comprise various types of isolation unit which each comprise a communications link to the electrical device 100 and some form of actuating means to restrict or switch off a flow of water, gas or electricity upon receiving a signal from the electrical safety device 100 in order to mitigate the potential effects of a hazard. In FIG. 2A the isolation device 150 shown is a local water isolation unit 151 which comprises a motorised valve such as that illustrated in FIG. 5B. The motorised valve 151 of the isolation unit 150 is positioned in the cold water feed supply line 161 which transports water from the main supply to an electrical appliance. The local water isolation unit includes a communications link 152 to the electrical safety device 100, which in the example of FIG. 2A takes the form of a cabled connection 152 which connects to a port in the housing of the electrical safety device 100 such that signals from the processor can be sent to the motorised valve 151 in order to actuate the valve. In this way, when a hazard is detected by the electrical safety unit 100 using one of the sensors 110, 113, 114, 115, 116 a signal may be sent to the local water isolation unit to actuate the valve 151 and shut off the supply of water to the electrical appliance, for example a washing machine or dish washer.

The electrical appliance may be plugged into the electrical safety device 100 with which the remote valve 151 is connected. In this way an electrical fault with the appliance itself can be identified, for example via the current sensor 115 or temperature sensor 110 and the water supply to the device can be shut off to prevent a leak from the faulty appliance. Similarly, if the water sensor 116 connected to the electrical safety device 100 detects the presence of a leak via water pooling on the ground below the device 100, the processor of the device 110 can send a signal via the communications link 152 to the local water isolation unit 150 in order to shut off the water supply. Shutting off the water supply can further mitigate the danger of electrical faults transmitting dangerous electric currents via leaking water from a particular appliance. Instead of using a cabled connection 152 the local water isolation unit 150 may comprise one or more modes of wireless communication in order to communicate with the electrical safety device 100 and other remote devices within the electrical safety system.

The electrical safety device 100 also includes a relay switch within the device 100 which is configured to disconnect the current supply to an electrical appliance connected to the electrical safety device 100 when the processor determines the presence of a hazard via signals received from one or more sensors. In this way; if a fault within the appliances detected the electrical supply from the mains electricity supply through the electrical safety device 100 can be stopped immediately to prevent the hazard developing further.

Plug-In Adaptor Safety Device

Figure 4:
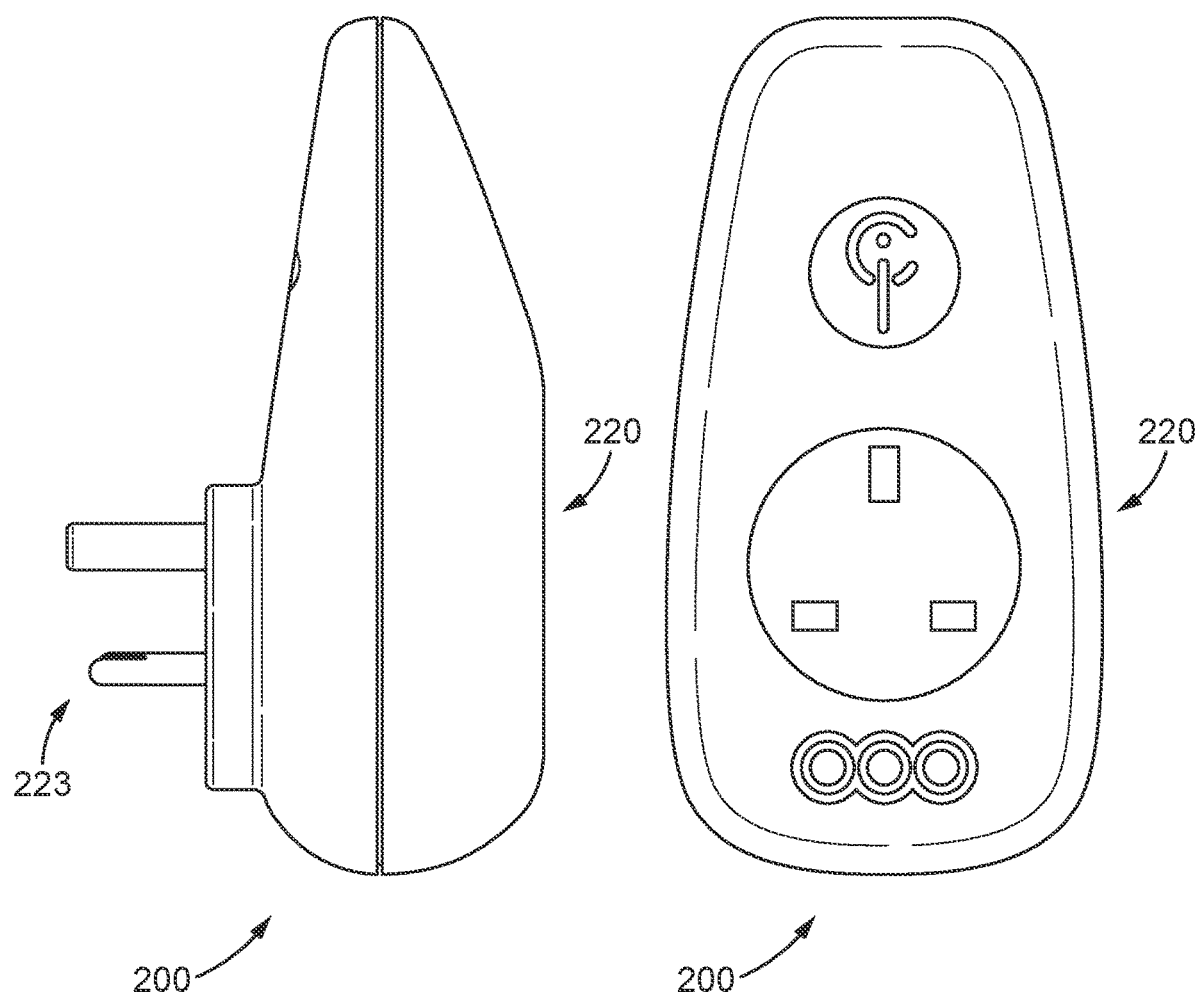
FIG. 4 schematically illustrates an electrical safety device according to the present invention which takes the form of a plug-in adaptor unit.

FIGS. 3 and 4 show an alternative electrical safety device 200 according to the present invention. The electrical safety device 200 shown in FIGS. 3 and 4 is a plug in adaptor unit 200 which is configured to plug into a mains socket and receive the plug of an electrical appliance such that the current supply from the main socket is transmitted through the adaptor unit 200 to the appliance. In this way, rather than installing electrical safety device face plates 100 as shown in FIGS. 1 and 2A, the plug in adaptor safety unit 200 may simply be plugged into existing mains terminals and electrical appliances plugged directly into the adaptor unit 200 to obtain the increased safety functionality explained above.

The electrical safety device 200 shown in FIGS. 3 and 4 includes all of the functionality described above with respect to the face plate safety device 100 shown in FIGS. 1 and 2A. In particular, it includes an infrared array sensor 210 moulded into the housing 230 of the device 200 so as to be directed across the outer surface of the housing 230 at a region on the outer surface corresponding to the socket 220 and therefore detect a surface temperature of the plug of an electrical appliance plugged into the adaptor unit 200. The electrical safety adaptor unit 200 also includes a built in current sensor 215 within the recesses corresponding to the socket 220; a smoke and gas sensor 213; a carbon monoxide sensor 214; a separate water sensor 116 which may be plugged in to the device 200 in order to detect the presence of water on the ground beneath the adaptor 200, a remote local water isolation unit 150 configured to close a motorised valve in order to stop the flow of water to a washing machine or dish washer; an internal alarm sounder 240; status LEDs 242; an on/reset/silence switch 241; and an internal processor configured to receive signals from each of the sensors, analyse these signals to determine whether they are indicative of the presence of a potential hazard and alert the user via the internal alarm sounder 240 or by sending an alert to a remote user device such as a smartphone.

A further functionality which may be present in each of the electrical safety devices 100, 200 according to the present invention is an internal battery backup, such that if the mains electricity fails or is switched off by the security system, the electrical safety devices 100, 200 continue to operate for a certain amount of time. The only difference therefore between the device 200 of FIGS. 3 and 4 and the device of FIGS. 1 and 2A is that the device 200 is in the form of an adaptor unit having a plug portion 223, shown in FIG. 4, allowing the device to be plugged into a main electrical point.

Remote Mains Supply Isolation

Figure 5A:
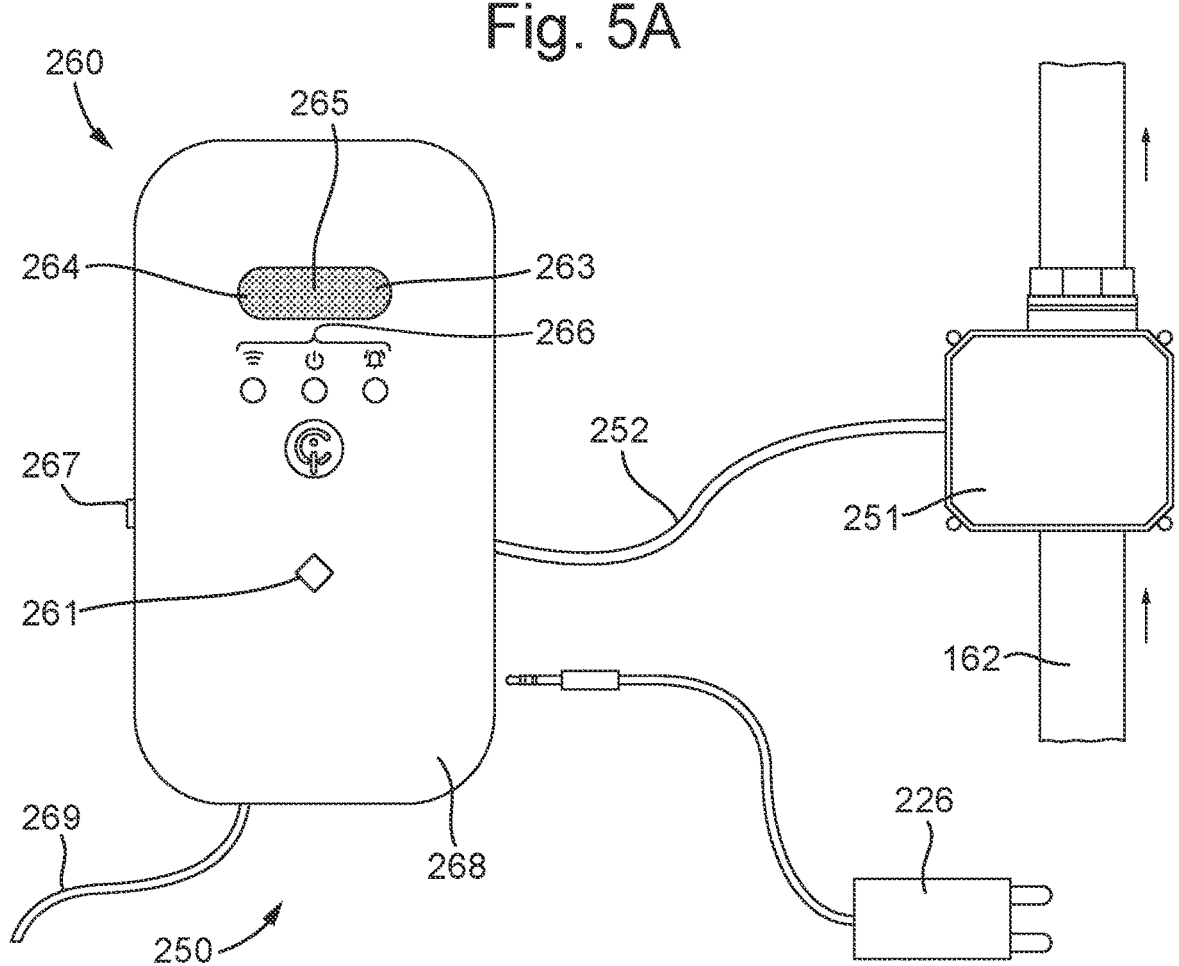
FIG. 5 schematically illustrates a remote device of an electrical safety system according to the present invention where the remote device is a mains supply isolation unit.

A further remote device forming part of the electrical safety system of the present invention is a mains supply isolation unit 250 shown in FIG. 5A. The mains supply isolation unit 250 comprises at least one motorised valve 251 arranged for installation in a mains supply—for example a main water feed, a header water tank or mains gas supply. The mains supply isolation unit 250 additionally includes a control unit 260 arranged for installation near the main supply. The mains supply isolation control unit 260 comprises a communications link to send signals to the motorised valve 251 in order to shut off the mains supply. In the example of FIG. 5A, the motorised valve 151 is provided within the mains water supply line 162 so as to shut off the mains water supply to the premises. The mains supply isolation control unit 260 comprises a communications link 252 configured to receive signals from an electrical safety device such as that shown in FIGS. 1 to 4 and control the motorised mains shut off valve 251 accordingly, in order to shut off the main supply in the case that a hazard is detected by one of the electrical safety devices 100, 200 in the electrical safety device network.

The main supply isolation control unit 260 may also include a number of local sensors with similar functionality to the electrical safety devices 100; 200 in order to detect the presence of a local hazard and shut off the main supply accordingly. In particular the main supply control unit 260 may include a thermal sensor 261, for example as explained above with reference to the electrical safety device 100, 200, configured to detect the presence of a spark, flame or rising temperature in the local vicinity; a smoke and gas sensor 263; a carbon monoxide sensor 264; and an optional water sensor 226 to detect the presence of water collecting on the ground below the control unit 260. The mains supply isolation unit 250 therefore has the required functionality to detect the presence of local hazards and shut off the mains supply accordingly, as well as alert other devices in the network. The mains supply control unit 260 also comprises an internal alarm sounder 265 to alert a user of the presence of the hazard and it can also transmit signals to a user device such as a smart phone or smart TV to alert the user with the location description of the detected hazard. The device may also have an internal battery back-up 268 as with the devices described above. The device may be connected directly to the mains power supply via connection 269.

Figure 5B:
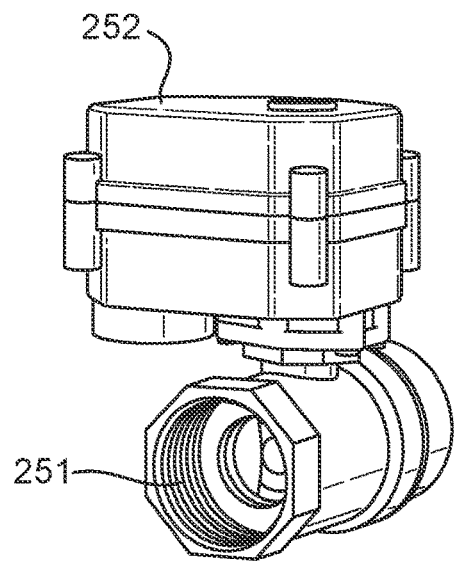

The main supply isolation unit 250 described above therefore provides additional functionality in terms of the control unit 260 with various sensors to detect local hazards. However a less complex main supply isolation unit may be provided more simply in the form of a motorised valve 251 and a wireless receiver 253 configured to receive a signal sent by an electrical safety device 100, 200, as shown in FIG. 5B. In this case the motorised valve 251 lies in the main supply line, for example the mains water feed, header water tank or mains gas supply and includes a wireless receiver 253 which simply comprises means to receive a signal sent by an electrical safety device within the electrical safety system and actuate the valve to shut off the main supply.

Figure 6:
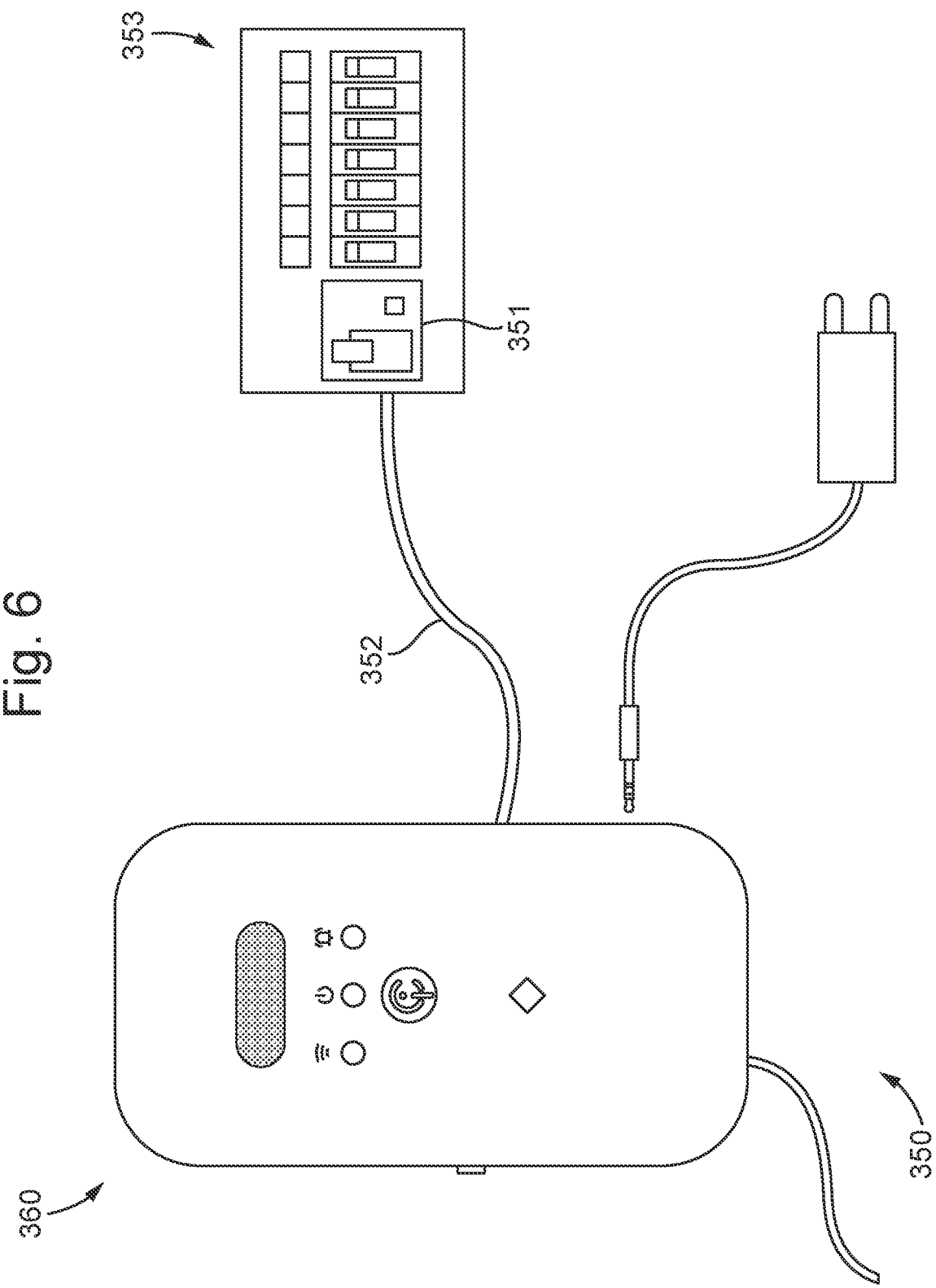
FIG. 6 schematically illustrates a remote device of an electrical safety system according to the present invention where the remote device is a mains electrical supply isolation unit.

The electrical safety system of the present invention may also include a mains electrical isolation unit 350, as shown in FIG. 6. The mains electrical isolation unit 250 comprises a mains electrical isolation control unit 360 which has exactly the same functionality as the control unit 260 described above with respect to FIG. 5A. In particular, it can receive signals sent from the electrical safety devices 100, 200 and remote devices in the electrical safety system network and can detect a number of local hazards using one or more local sensors. The electrical isolation unit 250 differs from the main supply isolation unit 250 in that it comprises a cabled or wireless communications link 352 to the main switch 351 within a consumer electrical unit (or a fuse box). In this way, when the main supply isolation control unit 360 either receives a signal from an electrical safety device indicative of the detection of a hazard or it detects a local hazard with one or more of the local sensors within the control unit 360, the internal processor sends a signal via the communications link 352 to the main switch 351 of the consumer unit 353 which shuts off the mains electrical supply. In this way a potential hazard can be prevented from spreading further by cutting the electrical supply to the building. In an alternative example all of the functionality of the control unit 360 may be directly integrated into a consumer unit/fuse box. Furthermore, as with the isolation units described above, a simpler version may be provided which simply includes a wireless receiver built into the consumer unit 353 and an actuator which switches the main switch 351 in the consumer unit 353 when the wireless receiver receives the signal from a remote device or electrical safety device 100, 200.

Electrical Safety System

Figure 7:
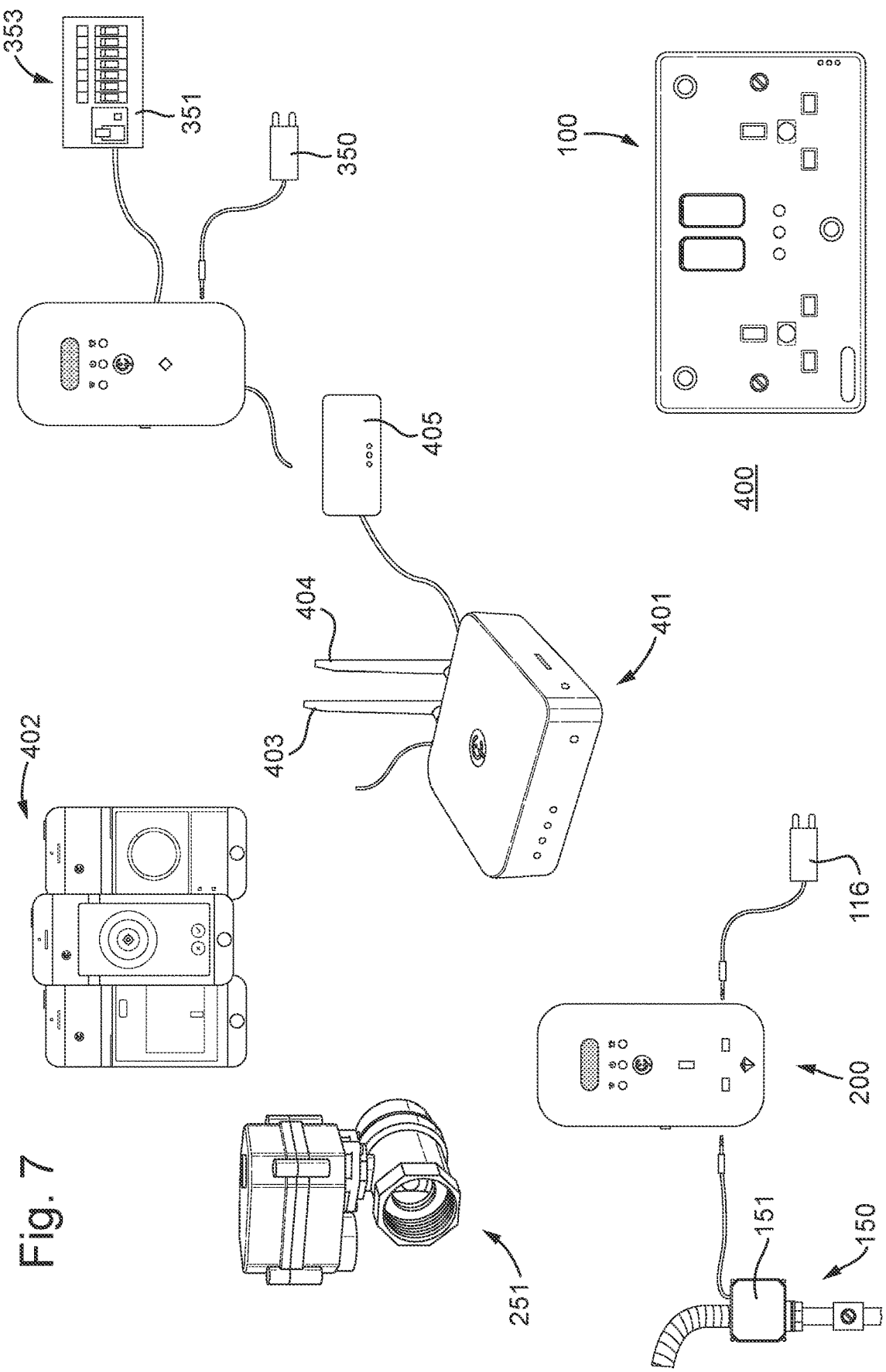
FIG. 7 schematically illustrates an exemplary electrical safety system according to the present invention.

FIG. 7 illustrates an exemplary electrical safety system network 400 according to the present invention. The electrical safety system 400 can include a plurality of electrical safety devices 100, 200 as described above and plurality of remote devices 250, 251, 350, 402. All of the remote devices and electrical safety devices may be able to communicate via wireless connectivity, for example, radio narrow band frequency, Wi-Fi® and Bluetooth® wireless communications links. Preferably the devices are each configured to communicate over two communication channels such that all of the devices can operate on two different types of networks as a failsafe. In this example, the devices can communicate via Wi-Fi® network 404 and a radio mesh network 403, for example 868 MHz. The connectivity of each of the devices in the network may be managed by a central smart hub 401 which is connected to the home router 405 and can manage the connectivity between the various remote devices and electrical safety devices. The smart hub 401 may also have the functionality described above in terms of sensors, connectivity and alerts associated with the devices previously described. By providing two communications networks, if one network goes down the devices can still communicate to provide an alert or take specific responses to shut down the main supply to mitigate the risk of a particular hazard.

As described above, one particular remote device may be a smartphone 402 as shown in FIG. 7. The smartphone (or other smart user device) may run an app with which the user can manage the system and receive alerts. In particular, when a hazard is detected a signal may be sent to the users smartphone and the app can display information on the hazard, for example that a fire has been detected, the location of the fire and provide options for the user to address the risk, for example by shutting off an electrical supply or calling emergency services. The app may also be configured to monitor current usage of the electrical appliances plugged into the electrical safety devices 100, 200. In particular, the electrical safety devices comprise a current sensor which can be used to monitor the amount of current which is used by a particular device plugged into the electrical safety device 100, 200. In this way, the user can monitor current usage and identify any potentially faulty units which display unusual current usage characteristics.

Because the current sensor measures the current provided by each socket, the electrical safety system can also monitor power consumption across each individual electrical safety device outlet point. This data can be provided to the smartphone app and stored in a memory to allow a user to optimise their electricity usage. This will provide a more accurate measure of power consumption and pin point any high current items using more electricity than normal over a period of time and send an alert to a smartphone. Furthermore, it can be used as a safety system, for example if no activity has been detected at certain times of the day, the electrical safety device will alert your smartphone. This can therefore be used to identify a lack of activity that might indicate a concern, for example for people living alone, in particular those ill or elderly who might be more at risk.

The app also allows for the relay switches on any of the electrical safety devices to be controlled remotely to switch on or off the current supply at a particular socket. For example the app allows the following functions: switch on or off, delay on or delay off timers, random mode for when a property is vacant.

The electrical safety system 400 may also be configured to take appropriate action automatically, without requiring user input via a user device 402. This automatic action may be programmed to be executed based on the particular hazards identified. For example, in the system of FIG. 7, if water is detected by the water sensor 116 connected to the electrical safety adaptor unit 200 the electrical safety adaptor unit can send a signal to the connected local water isolation unit 150 to actuate the remote valve 151 to close off the local water supply to the connected appliance and prevent further leakage. Similarly, if a power surge is detected by the current sensors in electrical safety devices 100, 200 or the infrared thermal sensors detect a rise in temperature associated with a power surge, the mains electrical isolation unit 350 can act to send a signal to the main switch 351 of the consumer unit 353 to shut off the mains electrical supply.

The electrical safety system can take the following actions either automatically or when prompted by a user, for example from a control interface such as the smartphone app.

Once an electrical safety device has identified a potential hazard, when the processor identifies that an output from a sensor exceeds the corresponding threshold value, the electrical safety device can take one or more of the following actions:

Sound a local alarm

Switch the power off locally on the plug-in adaptor, single socket or individually on each twin socket outlet.

Send a signal to the Hub via the radio MESH Network to send an Alert message to all smartphones paired to the system via AWS (Amazon Web Services). The hub can also inform third-party devices to activate via an industry standard protocol i.e. IFTTT (If This Then That) for example (other third-party protocols are available).

Alert other devices on the MESH Network to activate sounders, shut off outputs which are configurable.

Alert a voice assistant device to provide information on a hazard, options for responding and guidance to a user, for example how to exit the location safely.

Send signals to activate the remote water isolation valves on the main cold feed and the header tank and the remoted gas isolation valve to automatically to shut down.

Send a signal to the electrical mains isolation unit to remotely trip the mains consumer unit off.

With the electrical safety device according to the present invention, an early detection to identify hazards as an early stage is provided. In particular, by providing a thermal sensor directed to detect the surface temperature of the plug of an electrical appliance when inserted into the electric safety device 100, 200 an electrical safety fault can be detected before it escalates into a dangerous hazard such as a fire. The additional functionality provided by the additional sensors and into connectivity between the electrical safety devices and remote devices allows for hazards to be detected at an early stage a user to be alerted and appropriate action be taken to address the hazard. The current invention therefore makes progress over known devices in speed with which potential hazards can be identified and the additional functionality allowing for the hazards to be addressed automatically and users to be alerted efficiently.

Electrical Appliance with Integrated Thermal Sensor

Another possibility is providing an electrical appliance with an integrated electrical safety device. In particular an electrical appliance may comprise: a housing; electrical components within the housing configured to provide a function of the electrical appliance; a thermal sensor arranged to detect the surface temperature of the electrical components; and a processor in communication with the thermal sensor, the processor configured to determine when the sensed surface temperature exceeds a predetermined threshold.

In particular the electrical appliance might be a microwave, a gas or electric oven, a boiler, a consumer unit, a dishwasher, a fridge and/or freezer, a washing machine, a tumble drier or a charger.

The thermal sensor is an infrared array sensor as described above which is arranged within the electrical appliance so as to provide a contactless measurement of the surface temperature of the internal electrical components of the device. The thermal sensor is mounted so as to be directed at the internal electrical components which are most liable to overheat, such as one or more of: a motor, a heater, a power source, a fuse, and the connecting electrical circuitry. The thermal sensor uses a lens such that it has a field of view to cover a substantial portion of the electrical components which are monitored. The internal electrical safety device integrated within an electrical appliance works in exactly the same way as the electrical safety devices described above, apart from it is directed at a particular internal electrical component rather than the plug of the appliance, so the above description applies equally to the electrical appliance with integrated thermal sensor.

The electrical appliance also comprises a wireless communications link so it can be integrated in the above described electrical safety system to achieve the processes and advantages described above.

Additional Statements Defining Aspects of the Invention

A system according to the present invention comprises hazard detection devices and mitigation devices, connected through a network. The devices of the system are equipped with wireless network capabilities to allow communication between each other, and with external mobile communication devices, such as a smartphone. Communications between devices may be direct using a local network or may be via a remote server.

An electrical safety plug adapter comprises a socket, arranged to receive a plug of an external device, and a plug part, arranged to be inserted to a socket of an external power supply, such as a mains wall socket. The plug adapter is generally arranged to provide selective electrical connection between an electrical appliance (external device) and a household power supply (mains wall socket).

The adapter device includes at least one hazard sensor that is able to determine a potential hazard and disconnect the external device from the power supply. In this way, the adapter device can provide local detection of the hazard and prevent the external device from exacerbating the hazard. For example, if a refrigerator catches fire, the power supply to the refrigerator can be turned off which prevents the refrigerator from exacerbating the fire conditions. Additionally, earlier detection of a hazard is more likely that conventional detection systems as the sensors are closer to probably hazard causes.

The socket and plug part are connected through an internal circuitry of the adapter. The internal circuit may include a relay, arranged to selectively control the current between the plug part and the socket. Alternative means for selectively turning off power supply to the external devices are also contemplated. The internal circuitry may also include components for wireless communication, such as Mesh Radio Network, Wi-Fi® and Bluetooth® chipsets.

The adapter further comprises an integrated set of hazard detection sensors, such as CO, $CO_2$, smoke, gas, thermal, flame and water detection sensors. Each of the sensors are connected, through the internal circuitry, to the network of the system.

The smoke sensor is arranged to sense ambient levels of smoke, and may comprise sensing components arranged to utilise either, or both, of optical detection methods (such as photoelectric detection), or physical detection methods (such as ionization). When the sensed ambient smoke level exceeds a threshold value, the smoke sensor communicates with the internal circuitry to indicate a risk of fire.

The gas sensor is arranged to sense ambient levels of hazardous gas, such as combustible, flammable and toxic gases. The gas sensor may comprise sensing components arranged to utilise any, or a combination, of electrochemical, pellistor, photoionisation, infrared point, semiconductor detection methods. When the sensed ambient hazardous gas level exceeds a threshold value, the gas detector communicates with the internal circuitry to indicate a risk of gas leakage or fire.

The carbon monoxide sensor is arranged to sense ambient levels of carbon monoxide (CO). The CO sensor may comprise sensing components arranged to utilise any, or a combination of, biomimetic, electrochemical, opto-chemical and semi-conductor sensing methods. When the sensed ambient CO level exceeds a threshold value, the CO detector communicates with the internal circuitry to indicate a risk of CO leakage or fire.

The thermal sensor is arranged to sense ambient levels of thermal energy, and may comprise sensing components arranged to utilise either, or both, of mechanical and semi-conductor heat sensing methods. The thermal sensor is capable of detecting the surface temperature or a naked flame of any electrical appliance or a faulty appliance which in turn causes a short circuit and potential fire. When the sensed ambient thermal energy level exceeds a threshold value, the heat detector communicates with the internal circuitry to indicate a risk of fire.

Additional thermal sensors may monitor connections within the device to identify abnormal current flow or local hazard causing conditions. A further IR thermal sensor may create a thermal image of a local area and identify a hazard before it spreads.

In the event that one of the on-board sensors detects a parameter which indicates a potential hazard and/or fire, the adapter automatically actuates the relay such that the electrical connection between the plug part and the socket is interrupted. This ensures that, when a potential hazard is perceived by the adapter, electrical power supply to the potentially hazardous appliance is immediately switched off.

The adapter may further be connected, through its Mesh Radio Network, Wi-Fi® or Bluetooth® chipsets, to a system network. The adapter may be connected using a Wi-Fi® communications link to the internet or a local network, each device being in communication with one another or to a central server. A mesh network module may also be provided which enables the adapter to communicate with a device at a premises such as an isolation unit described below or a central hub located at the premises which communicates with all devices at the premises.

If a wireless communication device, such as a smartphone, is connected to the network, the plug may communicate with the wireless communication device to send an alert. Typically, such an alert may comprise a visible message and/or an audible sound.

The adapter may further comprise one or more LEDs to indicate the status of the adapter. For example, one LED may indicate an alarm status, while another LED may indicate normal status, and another LED may indicate communications taking place.

The adapter can be arranged to provide power from a wall supply to various household appliances. For example, the adapter may be arranged to connect to a power supply, a coffee maker, a microwave, a kettle, an extension sockets, a toaster, a hair straightener, washing machine, dishwasher, wall boiler, electric oven, tumble dryer, fridge/freezer or consumer unit.

Alternatively, the internal circuitry, wireless communication module and the hazard detection sensors described above may be built in to an integrated wall socket. In use, if a hazardous level of fire, water, CO or CO2 is detected locally or from any other remote device in the network, the integrated wall socket will automatically shut-off to isolate electrical supply to any connected appliances. As with the other devices in the network, a wireless communication module allows the integrated wall socket to wirelessly communicate via Wi-Fi® and radio narrow band frequency 868 MHz wireless communications links on a meshed network to other devices in the network.

In another example, the internal circuitry, wireless communication module and the hazard detection sensors described above may be installed in a docking unit. The docking unit may further comprise a connection member to allow a connection to an external mobile communication device such as a smartphone. In use, if a hazardous level of fire, water, CO or CO2 is detected locally or from any other remote device in the network, the docking unit will sound an alarm from an on-board speaker. If an external mobile communication device is connected to the docking unit when a hazard is detected, the docking unit can further send a signal to the mobile communication device to sound an alarm from the external device. As with the other devices in the network, a wireless communication module allows the docking unit to wirelessly communicate via Wi-Fi® and radio narrow band frequency 868 MHz wireless communications links on a meshed network to other devices in the network.

In addition to disconnecting the local power supply to the connected appliance or external device, the internal circuitry may also be configured to provide a disconnection message to a remote device or isolation unit. The isolation unit may be configured to disconnect a hazard causing condition or other aspect that may exacerbate the hazard.

For example, a water sensor positioned on the floor of a kitchen and connected to the adapter may sense the presence of water and remotely activate a valve which disconnects mains water supply to the premises so as to prevent further flood damage. Additionally, the detection of a fire hazard using the smoke or fire sensors may also disconnect the gas supply which could exacerbate the effects of a fire.

The isolation unit may comprise a wireless communication module and one or more isolation valves. The isolation unit is arranged to be fitted on a fluid handling system, such as water pipes, to control the flow of fluid through the fluid handling system. For example, the isolation unit may be installed on a water pipe which supplies water to an appliance, such as a dishwasher or a washing machine. In other examples, the isolation unit may be installed on supply pipes such as water pipes carrying the main water feed, header water tank outlet or gas supply. The isolation unit may also be part of an electrical supply system and remotely disconnect electrical supply to the premises, such as using an RCD, or residual current device.

The wireless communication module of the isolation unit may be a dual communications module. In particular, it may be a narrow band mesh radio network and CPU.

The isolation unit may further comprise one or more LEDs to indicate the status of the isolation unit. For example, one LED may indicate an alarm status, while another LED may indicate normal status, and another LED may indicate communications taking place.

In use, the isolation unit may respond to a wireless communications signal from a detection device, such as a plug adaptor, indicating that a potential hazard has been detected. When the isolation unit receives such a signal, the isolation unit may operate to close or open the isolation valve. The isolation unit may also send a communication message through the network, back to the detection device or to a mobile communication device such as a smartphone.

In some examples, the isolation unit itself may further comprise one of, or a combination of, hazard detection sensors described above, arranged to detect levels of hazardous parameters. In this case, when a leak or other risk is detected, the isolation unit may respond to that local detection to actuate the isolation valve. The isolation unit may further communicate, using the wireless communication module, with other devices in the network/system to actuate further valves or to send a message to a wireless communications device such as a smartphone.

Typically, the isolation valve of the isolation unit is a motorised valve, arranged to isolate a main water supply if a leak is detected locally or from any other remote device in the network/system.

The devices of the system including the local adapter and the remote isolation unit may each comprise one or more CPUs or microprocessors which perform the functionality described. Instructions may be stored on a computer readable medium which when executed by the processor(s)

cause the processors to execute the instructions. The devices may include a watchdog CPU which functions to reset radio or Wi-Fi® modules.

The invention claimed is:

1. An electrical safety device comprising:
   a socket arranged to receive an electrical plug of an electrical appliance to connect a current supply to the electrical appliance;
   a thermal sensor arranged to provide a contactless measurement of a temperature of the electrical plug when received in the socket;
   a processor in communication with the thermal sensor, the processor configured to determine when the temperature exceeds a predetermined threshold;
   a wireless communications link operably coupled to the processor and configured to connect with one or more remote devices to form a wireless network, the wireless communications link further configured to send a signal, via the wireless network, to a remote device in response to the processor determining that the temperature of the electrical plug has exceeded the predetermined threshold; and one or more of:
   a smoke and/or gas sensor;
   a carbon monoxide sensor; and
   a current sensor;
   wherein the processor is configured to compare behavior of a combination of sensed parameters against response data stored in a memory to identify a presence of a hazard.

2. The electrical safety device of claim 1 further comprising a housing wherein the socket is provided in a surface of the housing; wherein
   the thermal sensor is arranged to detect the temperature in a region external to the housing corresponding to the position of the socket.

3. The electrical safety device of claim 2 wherein the socket comprises a plurality of recesses and the thermal sensor is arranged within the housing between the plurality of recesses and directed out of the housing so as to detect a temperature of an underside surface of the electrical plug when received in the socket.

4. The electrical safety device of claim 2 wherein the thermal sensor is provided on the surface of the housing adjacent to the socket and the thermal sensor is directed along an outer surface of the housing to detect a temperature of a side surface of the electrical plug when received in the socket.

5. The electrical safety device of claim 1 wherein the electrical safety device is a plug-in adaptor unit further comprising:
   a plug part arranged to be received in a mains electrical socket, the plug part positioned relative to the socket such that the electrical plug of the electrical appliance can be received in the socket of the electrical safety device when the plug part is received in a mains socket.

6. The electrical safety device of claim 1 wherein the electrical safety device is a mains socket faceplate, configured to be mounted on a surface.

7. The electrical safety device of claim 1 further comprising:
   a relay switch configured to disconnect the current supply to the electrical appliance connected to the electrical safety device in response to the processor determining that the temperature of the electrical plug exceeds the predetermined threshold.

8. The electrical safety device of claim 1 further comprising an audible and/or visual alarm.

9. An electrical safety device comprising:
   a socket arranged to receive an electrical plug of an electrical appliance to connect a current supply to the electrical appliance;
   a thermal sensor arranged to provide a contactless measurement of a temperature of the electrical plug when received in the socket;
   a processor in communication with the thermal sensor, the processor configured to determine when the temperature exceeds a predetermined threshold;
   a wireless communications link operably coupled to the processor and configured to connect with one or more remote devices to form a wireless network, the wireless communications link further configured to send a signal, via the wireless network, to a remote device in response to the processor determining that the temperature of the electrical plug has exceeded the predetermined threshold; and
   a water sensor;
   wherein the electrical safety device comprises a main body housing the socket, the thermal sensor, and the processor; and
   the water sensor is arranged to be positioned on a surface below the main body of the electrical safety device wherein the water sensor is connectable to the main body by a cabled or wireless connection.

10. An electrical safety system comprising:
    an electrical safety device comprising:
       a socket arranged to receive an electrical plug of an electrical appliance to connect a current supply to the electrical appliance;
       a thermal sensor arranged to provide a contactless measurement of a temperature of the electrical plug when received in the socket; and
    a processor in communication with the thermal sensor, the processor configured to determine when the temperature exceeds a predetermined threshold; and
    one or more remote devices; wherein the electrical safety device comprises a communications link and the electrical safety device is configured to send a signal to the remote device using the communications link when the processor determines that the temperature of the electrical plug has exceeded the predetermined threshold,
    wherein the electrical safety system comprises one or more electrical safety devices and one or more remote devices,
    wherein the electrical safety devices and remote devices form a network in which the electrical safety devices and remote devices can communicate,
    wherein at least one remote device comprises an isolation unit comprising a communications link,
    wherein the isolation unit is configured to restrict a flow of water or gas through the isolation unit upon receiving a signal from the electrical safety device.

11. The electrical safety system of claim 10 wherein the communications link comprises a wireless communications link.

12. The electrical safety system of claim 10 wherein the electrical safety devices and remote devices are configured to communicate both by a Wi-Fi® wireless communications network and a narrow band radio frequency network.

13. The electrical safety system of claim 10 wherein at least one remote device comprises a smart user device and the smart user device is configured to provide an audio or visual alert after receiving a signal from the electrical safety device.

14. The electrical safety system of claim 10 wherein the isolation unit is further configured to restrict a flow of electricity through the isolation unit upon receiving the signal from the electrical safety device.

15. The electrical safety system of claim 14 wherein at least one isolation unit comprises a local water isolation unit arranged for installation at a local water connection to an electrical appliance; the local water isolation unit comprising:
- a cabled or wireless connection for connecting to the electrical safety device; and
- a motorised valve; wherein
- the local water isolation unit is configured to close the motorised valve to restrict a water supply to the electrical appliance upon receiving a signal from the electrical safety device.

16. The electrical safety system of claim 14 wherein at least one isolation unit comprises a mains supply isolation unit comprising:
- at least one motorised valve arranged for installation in a mains water feed, a header water tank, or mains gas supply; wherein
- the mains supply isolation unit is configured to close the at least one motorised valve to restrict the mains supply upon receiving a signal from the electrical safety device.

17. The electrical safety system of claim 14 wherein at least one isolation unit comprises a mains electrical isolation unit comprising:
- a mains electrical shut off switch; wherein
- the mains electrical isolation unit is configured to actuate the mains electrical shut off switch to shut off the mains electricity upon receiving a signal from the electrical safety device.

18. The electrical safety system of claim 17 wherein the mains electrical isolation unit is connected to a mains consumer unit and is configured to actuate a main switch on the mains consumer unit to shut off the main electricity supply.

19. The electrical safety device of claim 14 wherein the isolation unit comprises a processor and one or more local sensors, the one or more local sensors comprising one or more of:
- a thermal sensor;
- a smoke and/or gas sensor;
- a carbon monoxide sensor;
- a moisture and/or water sensor; or
- a current sensor; wherein the isolation unit is configured restrict a flow of water, gas or electricity when the processor determines that a parameter sensed by a local sensor exceeds a predetermined threshold.

* * * * *